United States Patent [19]

Nakaniwa

[11] Patent Number: 4,945,876
[45] Date of Patent: Aug. 7, 1990

[54] SYSTEM AND METHOD FOR DETECTING KNOCKING IN AN INTERNAL COMBUSTION ENGINE

[75] Inventor: Noriyuki Nakaniwa, Kanagawa, Japan

[73] Assignee: Nissan Motor Company, Limited, Yokohama, Japan

[21] Appl. No.: 307,467

[22] Filed: Feb. 8, 1989

[30] Foreign Application Priority Data

Feb. 8, 1988 [JP] Japan .................................. 63-28384

[51] Int. Cl.⁵ ............................................... F02P 5/15
[52] U.S. Cl. ......................................... 123/425; 73/35
[58] Field of Search ..................... 123/425, 435; 73/35

[56] References Cited

U.S. PATENT DOCUMENTS

| 4,331,117 | 5/1982 | Ginsburgh | 123/425 |
| 4,463,722 | 8/1984 | Kobayashi | 123/425 |
| 4,471,737 | 9/1984 | McDougal et al. | 123/425 |
| 4,640,249 | 2/1987 | Kawamura et al. | 123/425 |
| 4,660,535 | 4/1987 | Asano | 123/425 |

FOREIGN PATENT DOCUMENTS

| 58-53677 | 3/1983 | Japan . | |
| 107273 | 5/1987 | Japan | 123/425 |

Primary Examiner—Tony M. Argenbright
Attorney, Agent, or Firm—Foley & Lardner, Schwartz, Jeffery, Schwaab, Mack, Blumenthal & Evans

[57] ABSTRACT

A system and method for detecting an engine knocking for an internal combustion engine are disclosed in which an amplification factor of a voltage amplifier for amplifying a knock detection signal derived from a corresponding pressure-responsive sensor is changed according to a fuel characteristic, i.e., octane number of the fuel used for the engine.

13 Claims, 5 Drawing Sheets

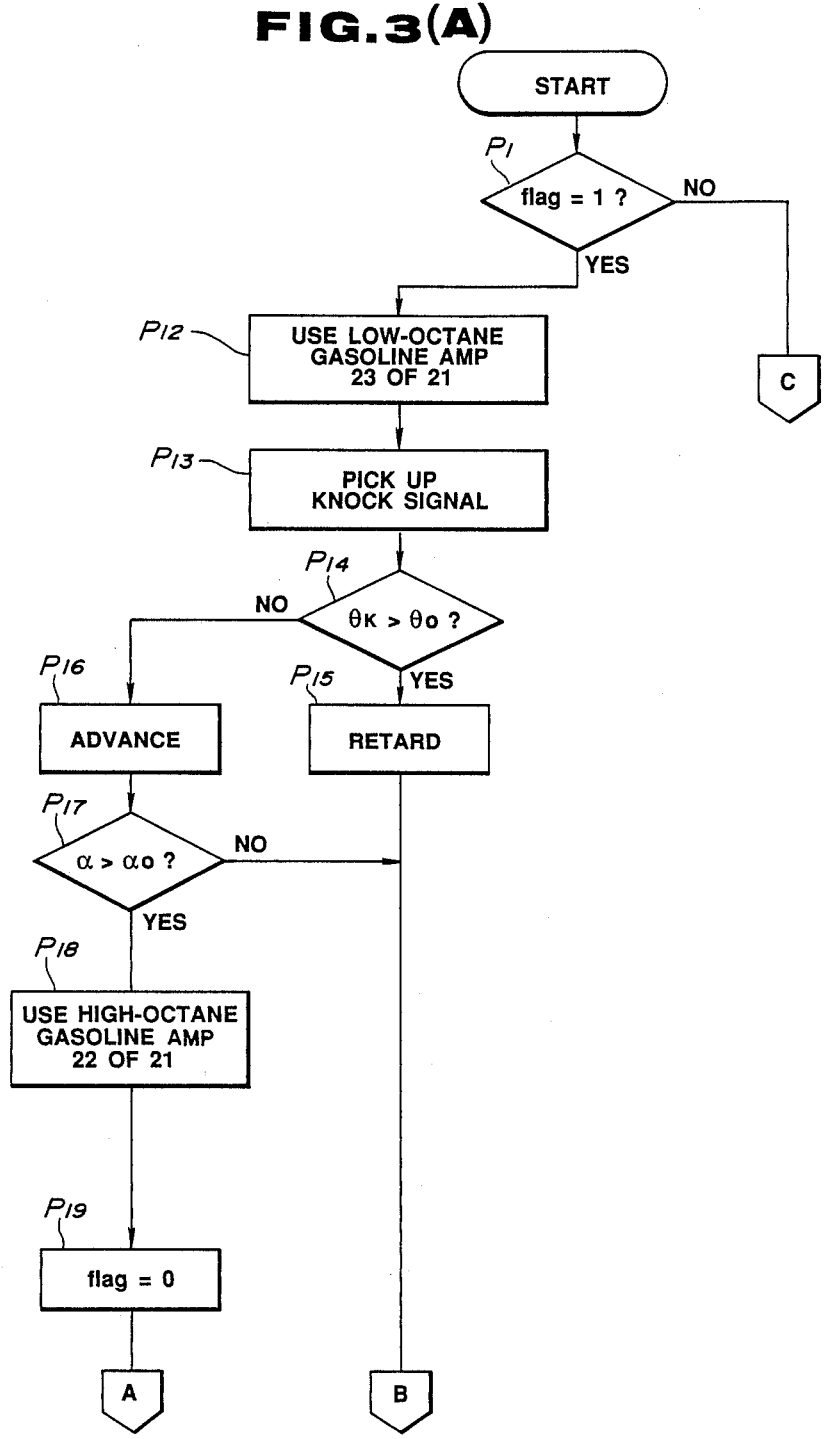

SYSTEM AND METHOD FOR DETECTING KNOCKING IN AN INTERNAL COMBUSTION ENGINE

BACKGROUND OF THE INVENTION

(1) Field of the Invention

The present invention relates to a system and method for detecting an engine knocking for an internal combustion engine which accurately detect the occurrence of the engine knocking even when the fuel characteristic is changed.

(2) Background of the Art

Whan a spark ignited engine is driven using a certain kind of fuel, with its compression ratio and/or its ignition timing advanced, an engine knocking would occur. The engine knocking would cause an overheat and/or reduction in performance of the engine, and, in worst cases, would cause damages in the engine.

An octane number of the fuel used for the engine represents an anti-knock characteristic of the fuel used to prevent such a reduction in the engine performance as described above.

Regular (Low-octane) gasoline—about 91 (octane); and

Super (High-octane) gasoline—about 98 (octane).

It is necessary to increase a combustion speed as high as possible and so as not to generate the engine knocking in terms of a thermal efficiency of the engine. The high-octane gasoline is advantageous due to its high octane number used as the fuel for the engine in which an advancement of an ignition timing is carried out to control the fuel combustion unless the engine knocking is generated.

The engine knocking is mainly caused by compressed ignition of uncombusted gas. When the engine knocking is serious, a loss of energy (low output power) and impact on each part of the engine, and reduction of the fuel saving are brought out. Therefore, it is desirable to avoid such a knocking. However, a light engine knocking itself does not have ill effect on the engine. If the ignition timing is advanced and the engine knocking occurs, the fuel consumption can be improved with the increase in the combustion efficiency of the engine. It is preferable to admit an appropriate engine knocking to achieve an operating condition at an optimum efficiency of the engine from the viewpoint of the fuel consumption.

Hence, to increase the engine driving efficiency and to suppress the knocking noise level below a predetermined value an intensity of the knocking needs to be controlled in accordance with various engine operating conditions.

In such a knocking control as described above, a knock sensor is mounted on an engine body. The occurrence of the engine knocking is determined on the basis of a level of a signal derived from the knock sensor. When the knocking occurs, the ignition timing is retarded. When no knocking occurs, the ignition timing is advanced.

Such a knocking controlling system as described above is exemplified by U.S. Pat. Nos. 4,660,535 issued on Apr. 28, 1987 and 4,640,249 issued on Feb. 3, 1987.

However, in such a knocking controlling system, the same knocking detecting method is used even when the fuel used for the engine has a different characteristic (,e.g, octane number). Therefore, since the detection accuracies of the same knocking are deviated due to differences in the fuel characteristics, the engine knocking control cannot effectively be achieved.

A Japanese Patent Application First Publication (Unexamined) No. sho 58-53677 published on Mar. 30, 1983 exemplifies another knocking controlling system in which the ignition timing is controlled according to the octane number of the fuel used.

In the ignition timing controlling system described in the above-identified Japanese Patent Application First Publication signal level passed through a band pass filter is measured under the same engine operating condition and the same knocking level. The ignition timings under the same situations were 23° BTDC when the high-octane gasoline was used and 14° BTDC when the low-octane gasoline was used, respectively.

The output signal of the band pass filter having the band pass of 12 Hz to 14 Hz is integrated and converted into a digital signal by means of an analog-to-digital converter. The digital signal is compared with a knock determination value (,i.e., a slice level). The integrated value in the case of the high-octane gasoline is larger than that in the case of the low-octane gasoline.

In this way, although the knock signals (12 to 14 Hz) in the cases of the high-octane gasoline and of the low-octane gasoline whose sounds can be heard by human's ears are the same level under the same conditions, the integrated values thereof are different (,i.e., the integrated value in the case of the high-octane gasoline is larger than that in the case of the low-octane gasoline). Hence, if, e.g., an amplification factor of the integrator is set so as to correspond to the high-octane gasoline (,i.e., a small amplification factor of the integrator is used), the detection of the knocking would fail in a case when the low-octane gasoline fuel is used. Then, the control of the knocking cannot appropriately be executed and the knocking sound would be heard upon the occurrence of the knocking. On the contrary, if the amplification factor of the integrator is set so as to correspond to the low-octane gasoline, the knocking control would be executed against the knocking which is relatively light so as to have a little effect on the engine performance. Then, the combustion efficiency would be reduced and fuel consumption could not be improved.

SUMMARY OF THE INVENTION

It is an object of the present invention to provide a system and method for detecting an engine knocking which can accurately detect the occurrence of knocking irrespective of a fuel characteristic to achieve an actual effect of a knocking control.

The above-described object can be achieved by providing a system for detecting an engine knocking for an internal combustion engine, comprising: (a) first means for detecting pressure vibrations of an engine body and outputting a signal indicative thereof: (b) second means for deriving a characteristic of a fuel used in the engine; (c) third means for amplifying the output signal from the first means with a predetermined amplification factor; (d) fourth means for filtering the amplified signal of the third means so as to pass a component of the amplified signal in a predetermined frequency range; and (e) fifth means for comparing the amplified and band passed signal of the fourth means with a predetermined slice level for determining the occurrence of the knocking, at least one of the predetermined amplification factor and predetermined slice level being varied according to the derived fuel characteristic.

The above-described object can also be achieved by providing a system for detecting an engine knocking for an internal combustion engine, comprising: (a) first means for detecting pressure vibrations on an engine body and outputting a signal indicative thereof; (b) second means for deriving a characteristic of a fuel used in the engine; (c) third means for amplifying the output signal from the first means with a predetermined amplification factor which is varied according to the fuel characteristic derived by the second means; (d) fourth means for filtering the amplified signal of the third means so as to pass a component of the amplified signal in a predetermined frequency range; and (e) fifth means for comparing the amplified and band passed signal of the fourth means with a predetermined slice level for determining the occurrence of the knocking.

The above-described object can also be achieved by providing a system for detecting an engine knocking for an internal combustion engine, comprising: (a) first means for detecting pressure vibrations on an engine body and outputting a signal indicative thereof; (b) second means for deriving a characteristic of a fuel used in the engine; (c) third means for amplifying the output signal from the first means with a predetermined amplification factor; (d) fourth means for filtering the amplified signal of the third means so as to pass a component of the amplified signal in a predetermined frequency range; and (e) fifth means for comparing the amplified and band passed signal of the fourth means with a predetermined slice level for determining the occurrence of the knocking, the predetermined slice level being varied according to the derived fuel characteristic.

The above-described object can also be achieved by providing a method for detecting an engine knocking for an internal combustion engine, comprising the steps of: (a) detecting pressure vibrations on an engine body and outputting a signal indicative thereof; (b) deriving a characteristic of a fuel used in the engine; (c) amplifying the output signal derived in the step (a) with a predetermined amplification factor; (d) filtering the amplified signal derived in the step (c) so as to pass a component of the amplified signal in a predetermined frequency range; and (e) comparing the amplified and band passed signal with a predetermined slice level for determining the occurrence of the knocking, at least one of the predetermined amplification factor and predetermined slice level being varied according to the derived fuel characteristic.

BRIEF DESCRIPTION OF THE DRAWINGS

FIGS. 3(A) and 3(B) are integrally a flowchart of an ignition timing control routine executed in a control unit shown in FIG. 1.

DETAILED DESCRIPTION OF THE PREFERRED EMBODIMENTS

Reference will hereinafter be made to the drawings in order to facilitate understanding of the present invention.

Figures 1, 2:
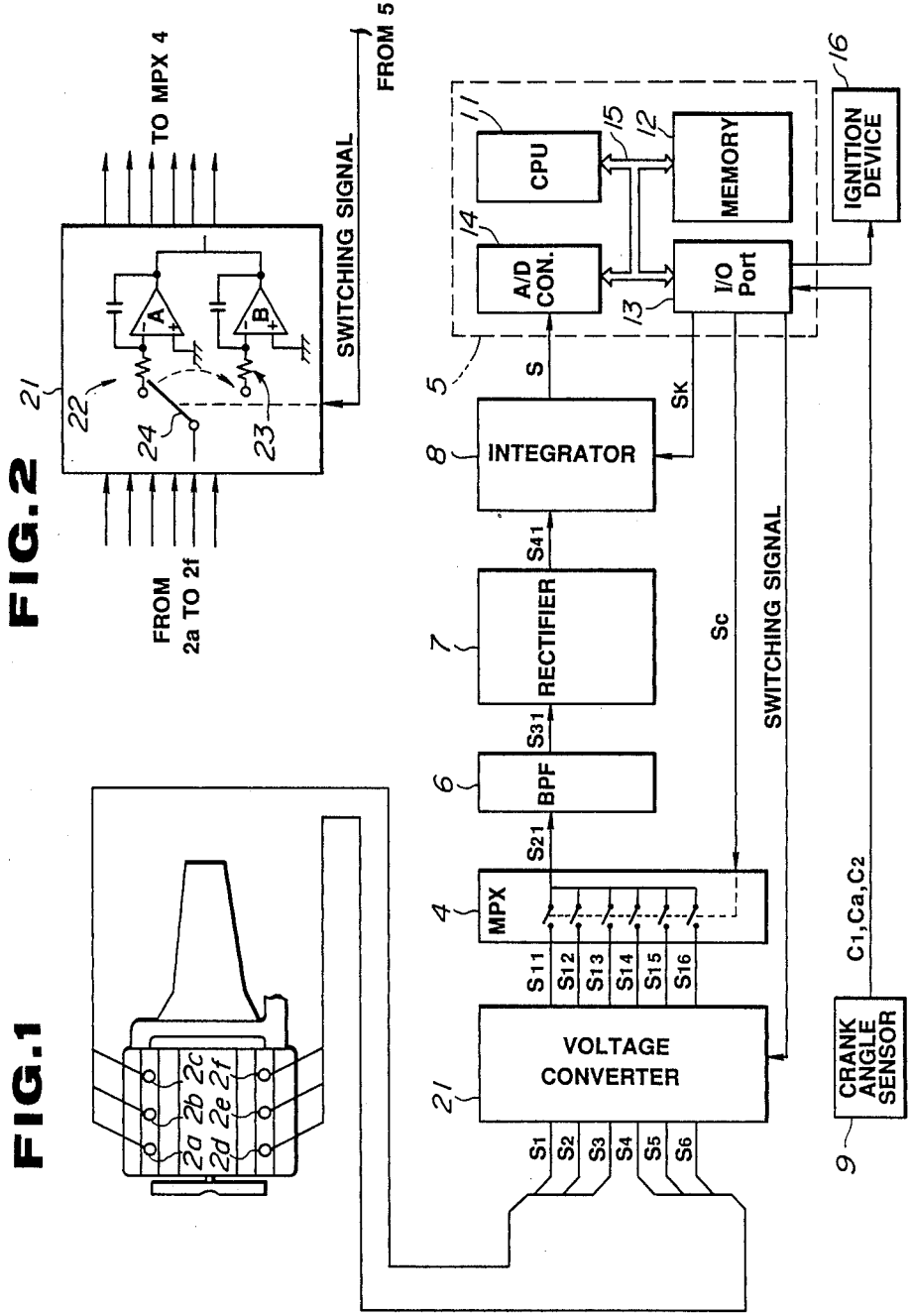
FIG. 1 is a circuit block diagram of an engine knocking detecting system in a preferred embodiment according to the present invention.
FIG. 2 is a circuit wiring diagram of a voltage converter used in the engine knocking detecting system shown in FIG. 1.

FIG. 1 shows an engine knocking detecting system in a preferred embodiment according to the present invention.

In FIG. 1, structures of an engine body 1, pressure-responsive sensors 2a to 2f, a multiplexor 4, a band-pass filter 6, a rectifier 7, an integrator 8, an ignition device 16, a crank angle sensor 9 and a control unit 5 are exemplified by two U.S. Pat. Nos. 4,640,249 and 4,660,535. The contents of the two U.S. Patents are hereby incorporated by reference.

FIG. 2 shows a circuit structure of each voltage converter 21 shown in FIG. 1.

Each voltage converter 21 serves as a charge-voltage converter (charge amplifier shown in FIG. 3 of the U.S. Pat. No. 4,660,535).

In the preferred embodiment shown in FIGS. 1 and 2, each voltage convertor 21 includes a first voltage amplifier 22 denoted by A used for a high-octane (super) gasoline fuel, a second voltage amplifier 23 denoted by B used for a low-octane (regular) gasoline fuel, and a drive switch 24 through which either of the first or second voltage amplifier 22 or 23 is connected between the corresponding pressure responsive sensor 2a to 2f and multiplexor 4 in response to a switching signal derived from the I/O port 13 of a microcomputer (control unit) 5. It is noted that in the preferred embodiment amplification factors of the voltage amplifiers 22 and 23 are different from each other and the first amplifier 22 has a lower amplification factor than that of the second voltage amplifier 23.

Figure 3B:
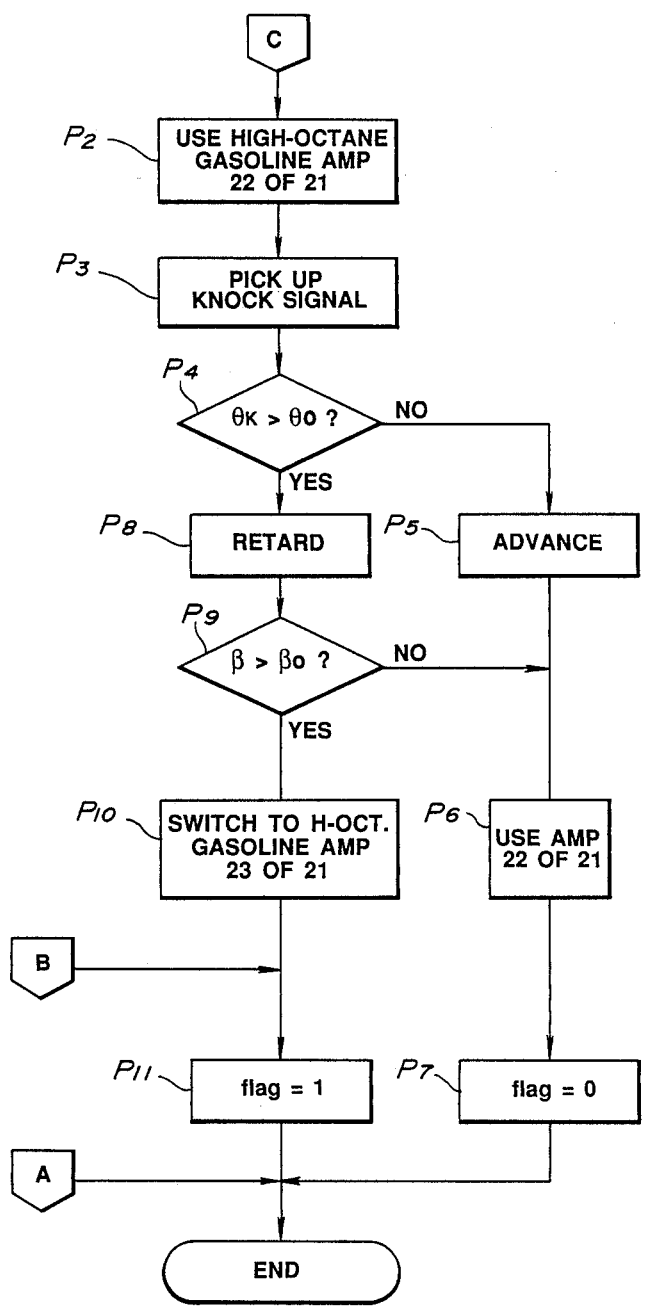

FIGS. 3(A) and 3(B) integrally show an ignition timing control routine executed by the CPU 11 in the microcomputer 5. The routine shown in FIGS. 3(A) and 3(B) is executed for each predetermined period of time.

In a step $P_1$, the CPU 11 determines if a flag is set to 1.

If the flag=0 in the step $P_1$, the CPU 11 produces and outputs the switching signal to the voltage converter 21 to select the first voltage amplifier 22 used for the high-octane gasoline fuel in a step $P_2$. Since the engine 1 is designed to meet the high-octane gasoline fuel, in the preferred embodiment, the routine initially (at the time of production of a vehicle in which the engine 1 shown in FIG. 1 is mounted) goes to the step $P_2$.

In a step $P_3$, the CPU 11 reads a knock signal $\theta_k$ which is amplified by means of the first voltage amplifier 22 and passed through the A/D converter 14. In a step $P_4$, the knock signal $\theta_k$ is compared with a predetermined slice level (knock determination value) $\theta_o$.

If $\theta_k \leq \theta_o$, the CPU 11 determines that no knocking occurs and the routine goes to a step $P_5$ in which the ignition timing is advanced.

Then, in a step $P_6$, the CPU 11 determines that the voltage amplifier 22 should be continuously used. Then, in a step $P_7$, the CPU 11 sets the flag to 0.

On the other hand, if $\theta_k > \theta_o$, the CPU 11 determines that the knocking occurs and the routine goes to a step $P_8$ in which the ignition timing angle is retarded.

It is noted that a basic ignition timing advance angle is determined, e.g., on the basis of an engine revolution speed and fuel injection quantity. A map determining the basic ignition timing angle is exemplified by the U.S. Pat. No. 4,660,535.

In a step $P_9$, the CPU 11 compares a retardation angle quantity $\beta$ used in the retardation of the ignition timing advance angle in the step $P_8$ with a predetermined retardation angle quantity $\beta_o$. The predetermined retardation angle quantity $\beta_o$ is a retardation angle used to determine whether the fuel used for the combustion in the engine is the high-octane (about 98 octane) or the low-octane (about 91 octane) gasoline.

If $\beta > \beta_o$, the routine goes to a step $P_{10}$ in which the CPU 11 determines that the fuel used is the low-octane gasoline and issues a switching signal to the voltage converter 21 to select the second voltage amplifier B 23.

Thereafter, in a step $P_{11}$, the flag is set to 1.

On the other hand, if $\beta \leq \beta_o$, the CPU 11 determines that the used fuel is the high-octane gasoline and switches the voltage amplifier to the first voltage amplifier 22 in the step $P_6$.

If the flag is set to 1 in the step $P_1$, the amplifier is switched to the second voltage amplifier 23 if the first voltage amplifier 22 is used.

In a step $P_{13}$, the CPU 11 reads the knock signal $\theta_k$.

In a step $P_{14}$, the knock signal $\theta_k$ is compared with the slice level $\theta_o$.

If $\theta_k > \theta_o$, the CPU 11 determines that the knock occurs and the routine goes to a step $P_{15}$ in which the ignition timing angle is retarded. If $\theta_k \leq \theta_o$, the CPU 11 determines that no knock occurs and the routine goes to a step $P_{16}$ in which the ignition timing angle is advanced.

In a step $P_{17}$, the CPU 11 compares an advance angle quantity alpha ($\alpha$) with a predetermined advance angle quantity alpha$_o$ ($\alpha_o$). The predetermined advance angle quantity alpha$_o$ is an advance angle used to determine that the fuel used is the high octane gasoline and the voltage amplifier should be changed to the first voltage amplifier 22. If alpha > alpha$_o$, the CPU 11 determines that the fuel is the high-octane gasoline and the routine goes to a step $P_{16}$ in which the voltage amplifier is switched to the first voltage amplifier 22. Thereafter, the routine goes to a step $P_{19}$ in which the flag is set to 0.

If alpha $\leq$ alpha$_o$, the routine goes to the step $P_{11}$ in which the flag is set to 1.

In the way described above, the retardation or advance angle quantity used to correct the ignition timing is compared with the corresponding predetermined slice level. Therefore, the fuel characteristic is appropriately determined and the voltage amplifier having the amplification factor which accords with the octane number of the fuel is selected. Hence, even if the fuel used is changed, the magnitude of the engine knocking is suppressed to the same level. In addition, such a problem that the knocking cannot be detected when the low-octane gasoline is used can be eliminated and the detection accuracy of the knocking can remarkably be improved.

Furthermore, since the amplifier factor for the knock signal is varied, the output level of the knock signal is increased so that the accuracy of detecting the knocking can be improved.

It is noted that although in the preferred embodiment the voltage amplifier is exchanged between first and second voltage amplifiers 22 and 23, the voltage amplification factor of the single voltage amplifier for each voltage converter 21 may be changed in response to the switching signal.

Figure 4A:
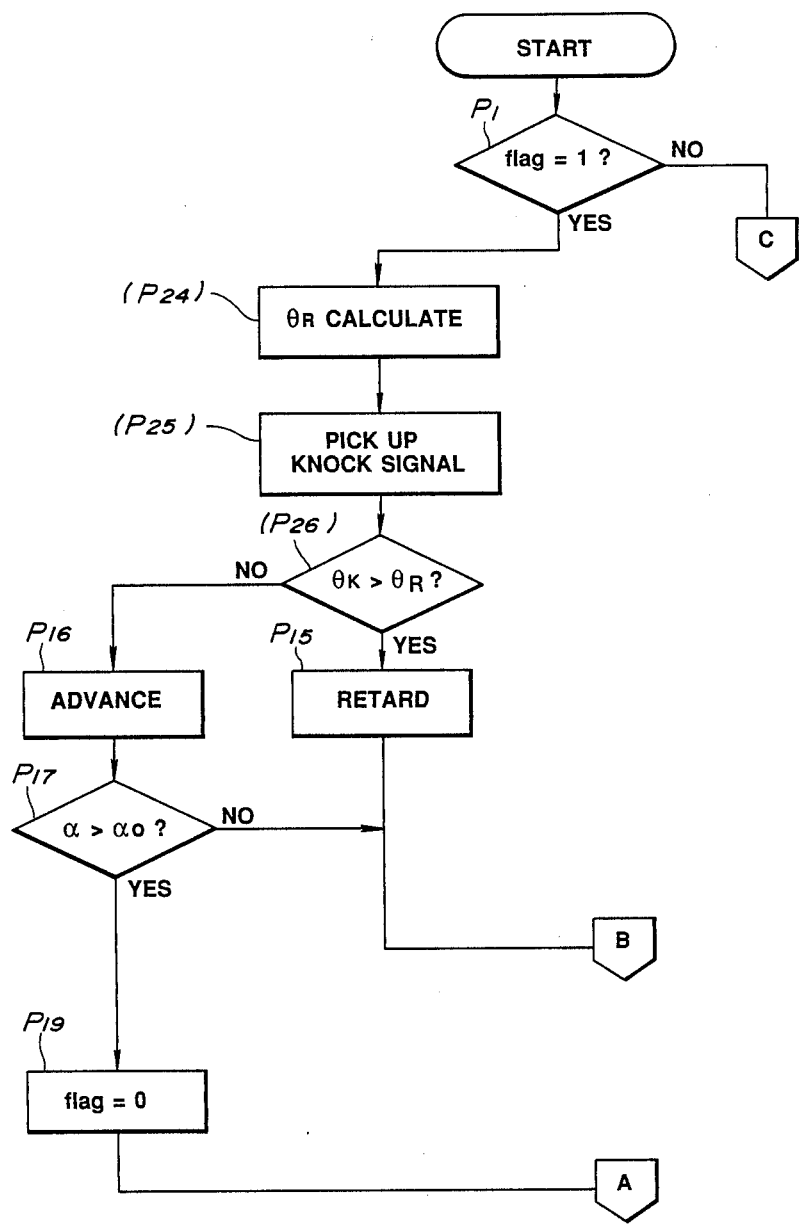
FIGS. 4(A) and 4(B) are integrally a flowchart of another ignition timing control routine executed in another preferred embodiment of the control unit shown in FIG. 1.
Figure 4B:
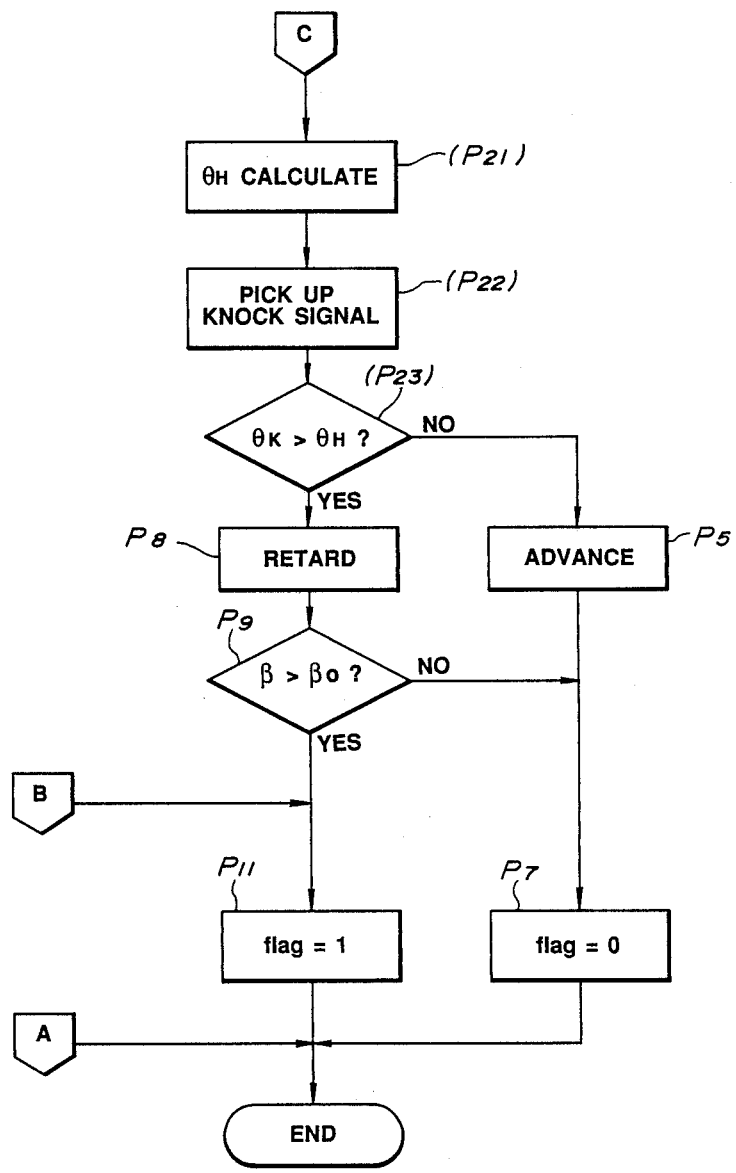

FIGS. 4 (A) and 4 (B) integrally show another ignition timing control routine in another preferred embodiment according to the present invention.

It is noted that a hardware structure of the other preferred embodiment is the same as shown in FIG. 1. It is also noted that the steps except those enclosed with brackets are the same as those shown in FIGS. 3 (A) and 3 (B).

If flag=0 in the step $P_1$, the routine goes to a step $P_{21}$ in which the knock determination value (slice level) $\theta_H$ for the high-octane gasoline fuel is calculated. For example, a predetermined value K which corresponds to a level of the knock signal indicating a thresold level of no occurrence of the knock when the low-octane gasoline is used is multiplied by a first constant A1. In a step $P_{22}$, the knock signal $\theta_k$ is read and in a step $P_{23}$ the CPU 11 compares the value of $\theta_k$ with the knock determination value $\theta_H$.

If $\theta_k > \theta_H$, the CPU 11 determines that the knock occurs and the routine goes to the step $P_8$. If $\theta_k \leq \theta_H$, the CPU 11 determines that no knocking occurs and the routine goes to the step $P_5$.

On the other hand, if the flag is set to 1 in the step $P_1$, the routine goes to a step $P_{24}$ in which the CPU 11 calculates a knock determination value $\theta_R$ used for the low-octane gasoline. For example, the predetermined value K is multiplied by a second constant B1 which is smaller than the first constant A1. Then, the CPU 11 reads the knock signal $\theta_k$ in a step $P_{25}$.

Thereafter, the routine goes to a step $P_{26}$ in which the CPU 11 compares the knock signal $\theta_k$ with the slice level $\theta_R$ calculated in the step $P_{24}$.

If $\theta_k > \theta_R$, the routine goes to the step $P_{15}$ since knocking occurs.

If $\theta_k \leq \theta_R$, the routine goes to the step $P_{16}$ since no knocking occurs. The following processes are the same as those shown in FIGS. 3 (A) and 3 (B).

Hence, in the other preferred embodiment, the knock determination value $\theta_H$ and $\theta_R$ is varied according to the fuel (octane number) used, i.e., the magnitude of the knocking vibrations. In addition, the structure becomes simplified as compared with the preferred embodiment shown in FIGS. 1 and 2 since no additional parts are needed.

It is noted that the routines shown in FIGS. 3 (A) to 4 (B) are executed for all pressure responsive sensors $2a$ to $2f$ in the case of a six-cylinder engine.

As described hereinabove, since in the knocking detecting system and method according to the present invention the amplification factor of each voltage converter or slice level to determine the occurrence of the engine knocking is changed according to the fuel characteristic, the more accurate detection of the engine knocking can be achieved.

It will fully be appreciated by those skilled in the art that the foregoing description is made in terms of the preferred embodiments and various changes and modifications may be made without departing from the scope of the present invention which is to be defined by the appended claims.

What is claimed is:

1. A system for detecting an engine knocking for an internal combustion engine, comprising:
   (a) first means for detecting pressure vibrations on an engine body and outputting a signal indicative thereof:
   (b) second means for deriving a characteristic of a fuel used in the engine;

(c) third means for amplifying the output signal from the first means with a predetermined amplification factor;
(d) fourth means for filtering the amplified signal of the third means so as to pass a component of the amplified signal in a predetermined frequency range; and
(e) fifth means for comparing the amplified and band passed signal of the fourth means with a predetermined slice level for determining the occurrence of the knocking, both the predetermined amplification factor and the predetermined slice level being varied according to the derived fuel characteristic.

2. A system as set forth in claim 1, wherein the second means derives an octane number of the fuel and the predetermined slice level becomes different depending on whether the octane number of the fuel is high or low.

3. A system as set forth in claim 1, wherein the predetermined slice level in the case of the high octane number fuel becomes higher than that in the case of the low octane number fuel.

4. A system as set forth in claim 1, wherein the high octane number indicates about 98 octane and the low octane number indicates about 91 octane.

5. A system for detecting an engine knocking for an internal combustion engine, comprising:
(a) first means for detecting pressure vibrations on an engine body and outputting a signal indicative thereof;
(b) second means for deriving a characteristic of a fuel used in the engine;
(c) third means for amplifying the output signal from the first means with a predetermined amplification factor which is varied according to the fuel characteristic derived by the second means;
(d) fourth means for filtering the amplified signal of the third means so as to pass a component of the amplified signal in a predetermined frequency range; and
(e) fifth means for comparing the amplified and band passed signal of the fourth means with a predetermined slice level for determining the occurrence of the knocking.

6. A system as set forth in claim 5, wherein the first means comprises a plurality of knock sensors installed on each engine cylinder for detecting the pressure vibrations on the corresponding engine cylinders.

7. A system as set forth in claim 5, wherein the second means includes sixth means for comparing a correction quantity of an ignition timing angle with a predetermined correction quantity, the predetermined correction quantity being a factor to determine whether the fuel used in the engine is a high octane gasoline or low-octane engine and the result of the comparison of the sixth means indicating the fuel octane number.

8. A system as set forth in claim 7, wherein the second means comprises a voltage converter including a first voltage amplifier having a first amplification factor and a second voltage amplifier having a second amplification factor, the first voltage amplifier being arranged for the high-octane gasoline fuel and connected between the first means and third means at an initial time of the engine start and the first amplification factor being lower than the second amplification factor.

9. A system as set forth in claim 8, wherein when the correction quantity exceeds the predetermined correction quantity with the first voltage amplifier being connected between the first and third means, the voltage amplifier is changed to the second voltage amplifier.

10. A system as set forth in claim 8, wherein when the correction quantity exceeds the predetermined correction quantity with the second voltage amplifier being connected between the first and third means, the voltage amplifier is changed to the second voltage amplifier.

11. A system as set forth in claim 9, wherein the correction quantity is a retardation angle to retard the ignition timing angle.

12. A system as set forth in claim 10, wherein the correction quantity is an advance angle to advance the ignition timing angle.

13. A method for detecting an engine knocking for an internal combustion engine, comprising the steps of:
(a) detecting pressure vibrations on an engine body and outputting a signal indicative thereof;
(b) deriving a characteristic of a fuel used in the engine;
(c) amplifying the output signal derived in the step (a) with a predetermined amplification factor;
(d) filtering the amplified signal derived in the step (c) so as to pass a component of the amplified signal in a predetermined frequency range; and
(e) comparing the amplified and band passed signal with a predetermined slice level for determining the occurrence of the knocking, both the predetermined amplification factor and the predetermined slice level being varied according to the derived fuel characteristic.

* * * * *